United States Patent
Guo et al.

(10) Patent No.: US 7,916,422 B1
(45) Date of Patent: Mar. 29, 2011

(54) DISK DRIVE ROTATING PHASE BASED SERVO BURSTS BASED ON RADIAL LOCATION OF HEAD

(75) Inventors: Guoxiao Guo, Foothill Ranch, CA (US); Abhishek Dhanda, Mission Viejo, CA (US); Jie Yu, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/790,608

(22) Filed: May 28, 2010

(51) Int. Cl.
G11B 5/596 (2006.01)
G11B 5/00 (2006.01)

(52) U.S. Cl. .................................. 360/77.08; 360/76

(58) Field of Classification Search .................. None
See application file for complete search history.

(56) References Cited

U.S. PATENT DOCUMENTS

| | | | |
|---|---|---|---|
| 4,438,467 A | 3/1984 | Schaller et al. | |
| 4,669,004 A | 5/1987 | Moon et al. | |
| 5,381,281 A | 1/1995 | Shrinkle et al. | |
| 5,483,393 A | 1/1996 | Mento et al. | |
| 5,710,677 A | 1/1998 | Teng et al. | |
| 5,798,883 A | 8/1998 | Kim | |
| 5,870,243 A | 2/1999 | Ukani et al. | |
| 5,930,068 A | 7/1999 | Gregg et al. | |
| 5,946,158 A | 8/1999 | Nazarian et al. | |
| 5,982,173 A | 11/1999 | Hagen | |
| 6,005,739 A | 12/1999 | Yun | |
| 6,067,204 A | 5/2000 | Tremaine | |
| 6,091,564 A | 7/2000 | Codilian et al. | |
| 6,091,567 A | 7/2000 | Cooper et al. | |
| 6,144,513 A | 11/2000 | Reed et al. | |
| 6,151,180 A | 11/2000 | Bang | |
| 6,163,419 A | 12/2000 | Sobey et al. | |
| 6,172,836 B1 | 1/2001 | Bang | |
| 6,369,974 B1 | 4/2002 | Asgari et al. | |
| 6,445,522 B1 | 9/2002 | Tsunoda et al. | |
| 6,476,997 B2 | 11/2002 | Fukushima et al. | |
| 6,611,397 B1 | 8/2003 | Nguyen | |
| 6,687,080 B2 | 2/2004 | Smith et al. | |
| 6,735,040 B2 | 5/2004 | Galloway et al. | |
| 6,754,016 B2 | 6/2004 | Messner et al. | |
| 6,768,609 B2 | 7/2004 | Heydt et al. | |
| 6,791,778 B2 | 9/2004 | Chu et al. | |
| 6,906,883 B2 | 6/2005 | Chu et al. | |
| 6,937,420 B1 | 8/2005 | McNab et al. | |
| 6,954,323 B2 | 10/2005 | Deeman et al. | |
| 6,989,956 B2 | 1/2006 | Takaishi et al. | |
| 7,009,391 B2 | 3/2006 | Lee et al. | |

(Continued)

FOREIGN PATENT DOCUMENTS

JP 2001256741 A 9/2001

*Primary Examiner* — Andrew L Sniezek

(57) ABSTRACT

A disk drive is disclosed comprising a head actuated over a disk comprising a plurality of servo tracks defined by a plurality of servo sectors, wherein each servo sector comprises a plurality of servo bursts, and each servo burst comprises a predetermined phase. After positioning the head over one of the servo tracks, a servo burst in one of the servo sectors is read to generate a read signal, and a sine and cosine component are extracted from the read signal. At least one of the sine and cosine components is rotated by an angle based on a radial location of the head. A position error signal for the head is generated in response to the rotated component.

14 Claims, 5 Drawing Sheets

U.S. PATENT DOCUMENTS

| | | |
|---|---|---|
| 7,019,937 B1 | 3/2006 | Liikanen et al. |
| 7,023,637 B1 | 4/2006 | Kupferman |
| 7,027,257 B1 | 4/2006 | Kupferman |
| 7,061,708 B2 | 6/2006 | Ehrlich et al. |
| 7,082,005 B2 | 7/2006 | Annampedu et al. |
| 7,123,433 B1 | 10/2006 | Melrose et al. |
| 7,130,146 B2 | 10/2006 | Ehrlich |
| 7,149,048 B1 | 12/2006 | Ray et al. |
| 7,158,333 B1 | 1/2007 | Sutardja et al. |
| 7,161,759 B1 | 1/2007 | Zhang et al. |
| 7,180,696 B2 | 2/2007 | Ehrlich |
| 7,203,024 B2 | 4/2007 | Lee et al. |
| 7,209,314 B2 | 4/2007 | Bandic et al. |
| 7,212,364 B1 | 5/2007 | Lee |
| 7,230,786 B1 | 6/2007 | Ray et al. |
| 7,230,789 B1 | 6/2007 | Brunnett et al. |
| 7,245,451 B2 | 7/2007 | Ehrlich |
| 7,248,426 B1 | 7/2007 | Weerasooriya et al. |
| 7,253,984 B1 | 8/2007 | Patapoutian et al. |
| 7,256,956 B2 | 8/2007 | Ehrlich |
| 7,265,933 B1 | 9/2007 | Phan et al. |
| 7,382,564 B1 | 6/2008 | Everett et al. |
| 7,391,583 B1 | 6/2008 | Sheh et al. |
| 7,397,621 B2 | 7/2008 | Hou et al. |
| 7,423,835 B2 | 9/2008 | Sado et al. |
| 7,450,336 B1 | 11/2008 | Wang et al. |
| 7,502,197 B1 | 3/2009 | Chue |
| 7,542,230 B1 | 6/2009 | Melrose et al. |
| 7,567,405 B2 | 7/2009 | Kato et al. |
| 7,616,399 B1 | 11/2009 | Chen et al. |
| 7,746,592 B1 | 6/2010 | Liang et al. |
| 7,746,594 B1 | 6/2010 | Guo et al. |
| 7,746,595 B1 | 6/2010 | Guo et al. |
| 2006/0279873 A1* | 12/2006 | Bandic et al. ............... 360/78.04 |
| 2007/0171564 A1* | 7/2007 | Ehrlich et al. ............ 360/77.08 |
| 2007/0273992 A1 | 11/2007 | Kuroda |
| 2008/0239536 A1 | 10/2008 | Asakura |
| 2009/0040641 A1 | 2/2009 | Ehrlich et al. |
| 2009/0046385 A1 | 2/2009 | Yamamoto |
| 2009/0067084 A1 | 3/2009 | Lau et al. |
| 2009/0067090 A1 | 3/2009 | Ling et al. |
| 2009/0097157 A1 | 4/2009 | Spaur et al. |
| 2009/0316295 A1 | 12/2009 | Kim et al. |
| 2010/0053800 A1 | 3/2010 | Ozturk et al. |
| 2010/0128386 A1* | 5/2010 | Keizer et al. ............... 360/77.07 |

* cited by examiner

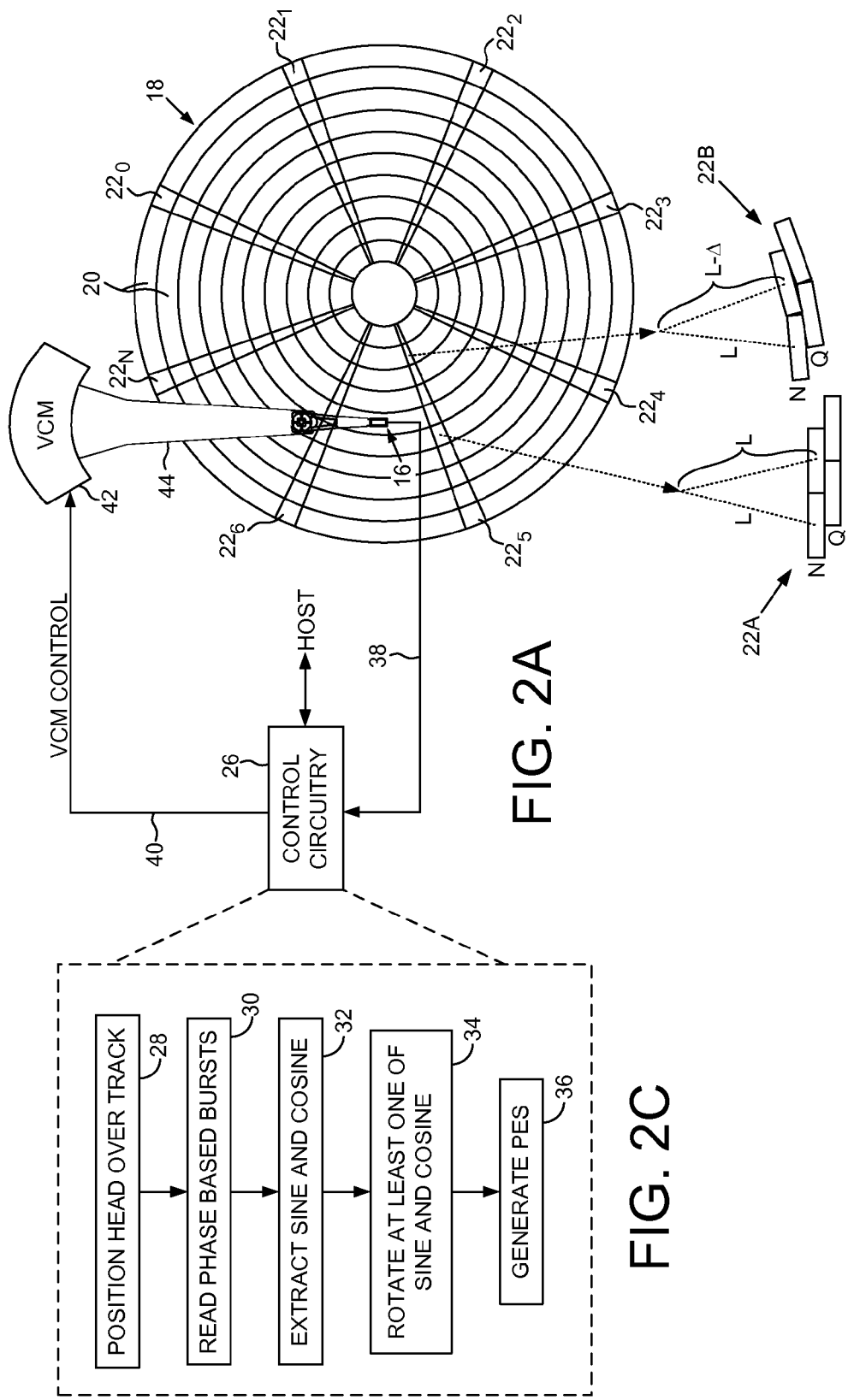

N_angle[tk#] = atan(N_cos/N_sin)

Q_angle[tk#] = atan(Q_cos/Q_sin)

N'_sin = N_cos·sin(N_angle[tk#]) + N_sin·cos(N_angle[tk#])

N'_cos = N_cos·cos(N_angle[tk#]) − N_sin·sin(N_angle[tk#])

Q'_sin = Q_cos·sin(Q_angle[tk#]) + Q_sin·cos(Q_angle[tk#])

Q'_cos = Q_cos·cos(Q_angle[tk#]) − Q_sin·sin(Q_angle[tk#])

N_angle[tk#] = (atan_1(N_cos/N_sin) + atan_2(N_cos/N_sin)) / 2

Q_angle[tk#] = (atan_1(Q_cos/Q_sin) + atan_2(Q_cos/Q_sin)) / 2

DISK DRIVE ROTATING PHASE BASED SERVO BURSTS BASED ON RADIAL LOCATION OF HEAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the track centerlines. The phased based servo bursts 14 provide fine head position information used for centerline tracking while accessing a data track during write/read operations.

BRIEF DESCRIPTION OF THE DRAWINGS

FIG. 2A shows a disk drive according to an embodiment of the present invention comprising a head actuated over a disk and control circuitry.

FIG. 2B illustrates how a radial location of the head when writing adjacent servo bursts introduces a phase offset between adjacent servo bursts.

FIG. 2C is a flow diagram executed by the control circuitry according to an embodiment of the present invention wherein at least one of a sine and cosine component when reading the servo bursts is rotated to compensate for the phase offset due to the radial location of the head.

DETAILED DESCRIPTION OF EMBODIMENTS OF THE INVENTION

Figure 1:
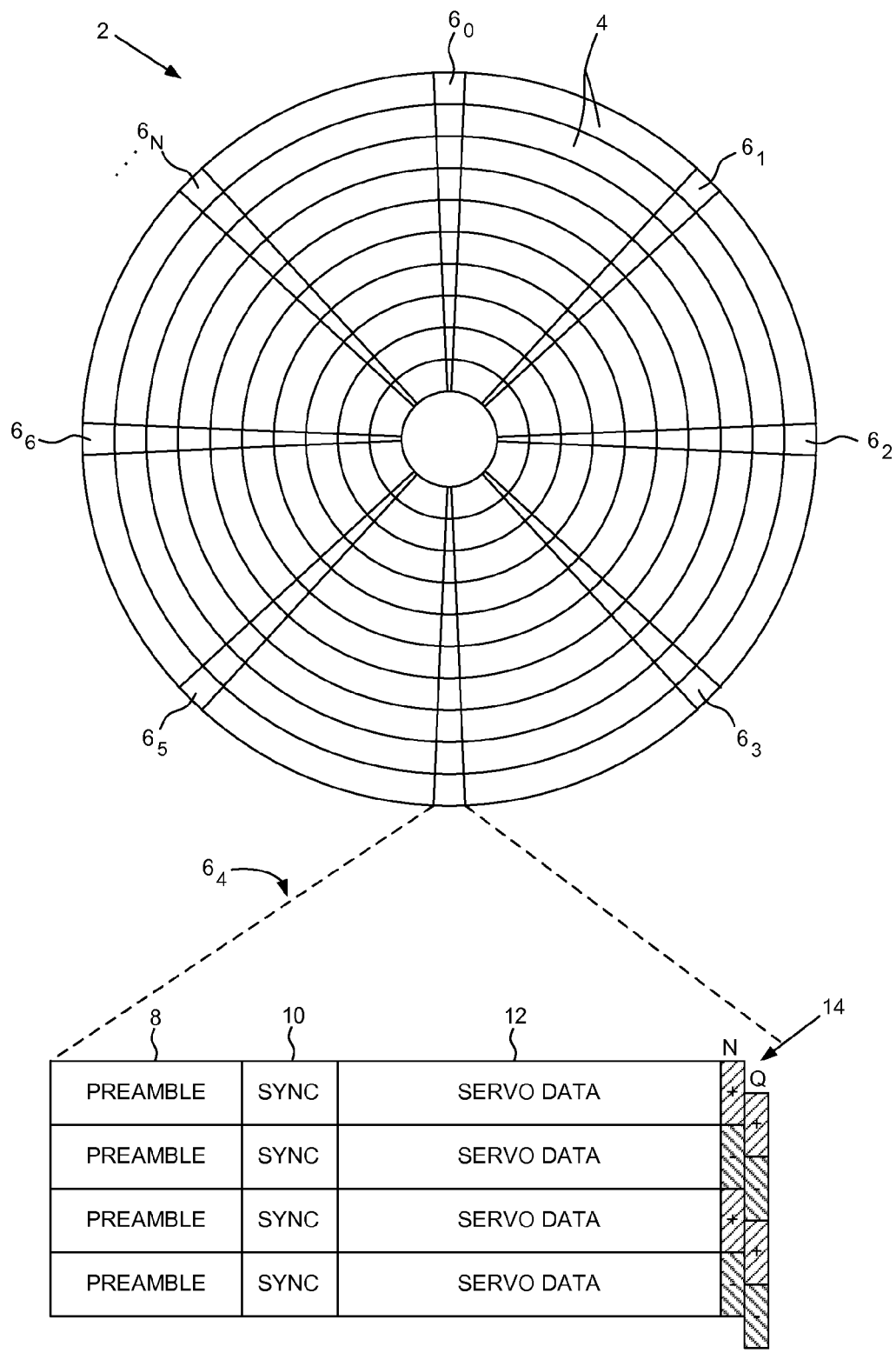
FIG. 1 shows a prior art disk format comprising a plurality of servo tracks defined by embedded servo sectors comprising phase based servo bursts.

FIG. 2A shows a disk drive according to an embodiment of the present invention comprising a head 16 actuated over a disk 18 comprising a plurality of servo tracks 20 defined by a plurality of servo sectors $22_0$-$22_N$, wherein each servo sector comprises a plurality of servo bursts 24A (FIG. 2B), and each servo burst comprises a predetermined phase (FIG. 1). The disk drive further comprises control circuitry 26 operable to execute the flow diagram of FIG. 2C, wherein after positioning the head over one of the servo tracks (step 28) a servo burst in one of the servo sectors is read to generate a read signal (step 30), and a sine and cosine component are extracted from the read signal (step 32). At least one of the sine and cosine components is rotated by an angle based on a radial location of the head (step 34). A position error signal (PES) for the head is generated in response to the rotated component (step 36).

In the embodiment of FIG. 2A, the control circuitry 26 processes the read signal 38 emanating from the head 16 in order to demodulate the servo sectors $22_0$-$22_N$ and generate the PES. The control circuitry 26 filters the PES using a suitable compensation filter to generate a control signal 40 applied to a voice coil motor (VCM) 42. The VCM 42 rotates an actuator arm 44 about a pivot in order to position the head 16 radially over the disk 18 in a direction that reduces the PES.

In one embodiment, the servo sectors $22_0$-$22_N$ are written to the disk 18 internally by each disk drive, for example, by servoing off of a seed pattern recorded on the disk (e.g., spiral seed patterns). Other embodiments may employ a servo writer to write the servo sectors $22_0$-$22_N$ to the disk 18 using the head 16 internal to the disk drive, and in other embodiments, a media writer may be used to write the servo sectors $22_0$-$22_N$ to the disk 18. In each of these embodiments, the arcuate path of the head as it moves radially over the disk may generate a phase offset between adjacently written servo bursts. This is illustrated in FIG. 2B wherein when writing a servo sector near the middle diameter of the disk the adjacent servo bursts 24A are substantially aligned such that the phase offset between adjacent servo bursts is substantially zero. As the head writes the servo sectors away from the middle diameter of the disk (e.g., at the inner diameter), a skew is introduced between the adjacent servo bursts 24B which introduces a phase offset between adjacent servo bursts. In one embodiment, at least one of the sine and cosine components of the servo burst read signal is rotated by an angle based on a radial location of the head to compensate for the effect of this phase offset.

Figure 3A:
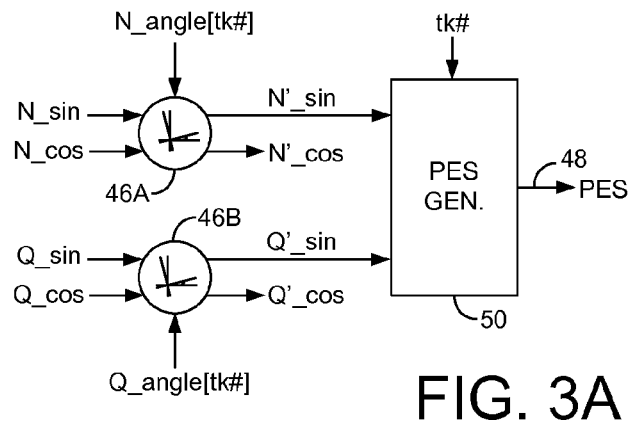
FIG. 3A shows control circuitry for rotating the sine and cosine components when reading the servo bursts, wherein a position error signal is generated from the rotated sine components.

FIG. 3A shows control circuitry for rotating 46A and 46B the sine and cosine components when reading the servo bursts, wherein a PES 48 is generated from the rotated sine components N'_sin and Q'_sin. Any suitable PES generator 50 may be used to generate the PES 48 in response to the N'_sin and Q'_sin components, including any conventional technique disclosed in the prior art for processing phase based servo bursts. A technique according to an embodiment of the present invention for rotating 46A and 46B the sine and cosine components when reading the servo bursts is disclosed below with reference to FIG. 4C.

Figure 3B:
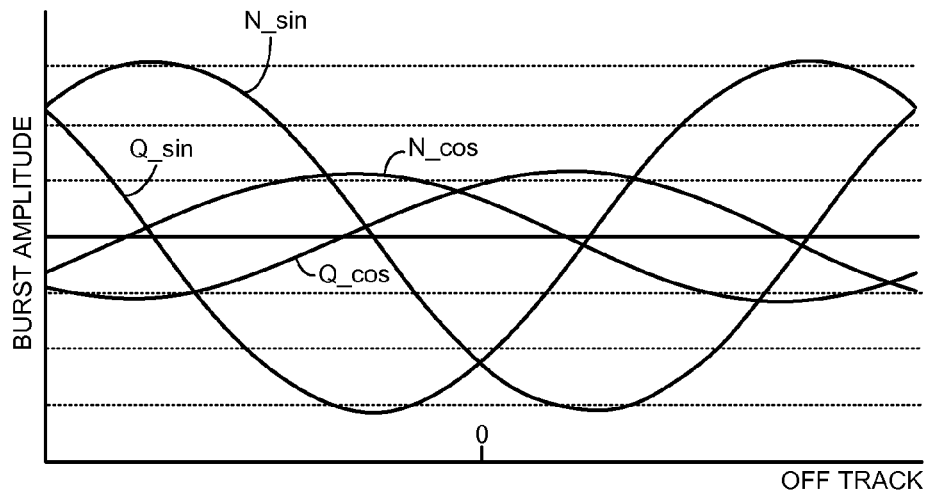
FIG. 3B shows how the phase offset due to the radial location of the head results in a non-zero cosine component when reading the servo bursts.
Figure 3C:
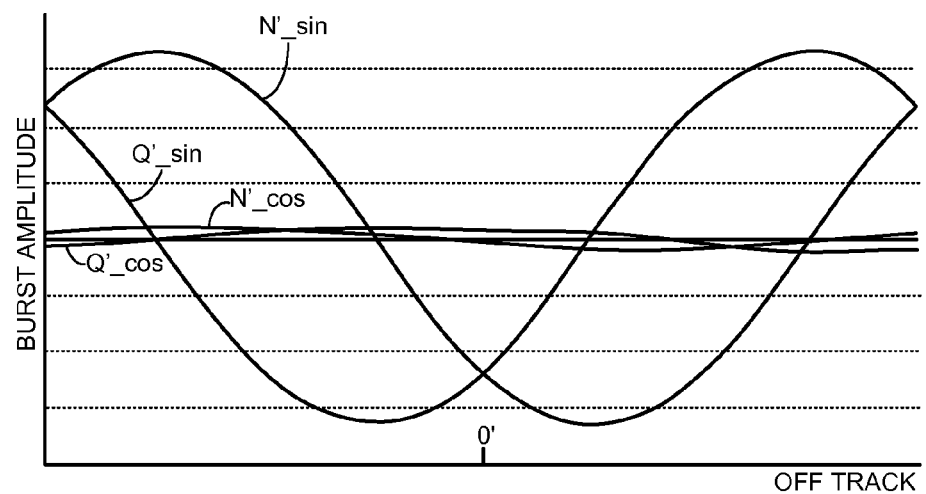
FIG. 3C illustrates an embodiment of the present invention wherein rotating at least one of the sine and cosine components reduces the cosine component, thereby compensating for the phase offset.

FIG. 3B illustrates the sine and cosine components of the read signal when reading adjacent servo bursts written with a phase offset as described above. In one embodiment, the phase offset induces a non-zero cosine component (N_cos and Q_cos) in the read signal. FIG. 3C illustrates the effect of rotating the sine and cosine components of the read signal, wherein the amplitude of the cosine components (N'_cos and Q'_cos) is reduced leading to a more accurate PES generated from the rotated sine components (N'_sin and Q'_sin). Rotating the sine components of the read signal increases the amplitude of the rotated sine components (N'_sin and Q'_sin) as well as introduces a phase shift. Accordingly, the resulting PES before rotating the sine components will define a first radial position as the center of the servo track (the 0 point in FIG. 3B), whereas the PES after rotating the sine components will define a second (more accurate) radial position as the center of the servo track (the 0' point in FIG. 3C).

Figures 4A, 4B, 4C:
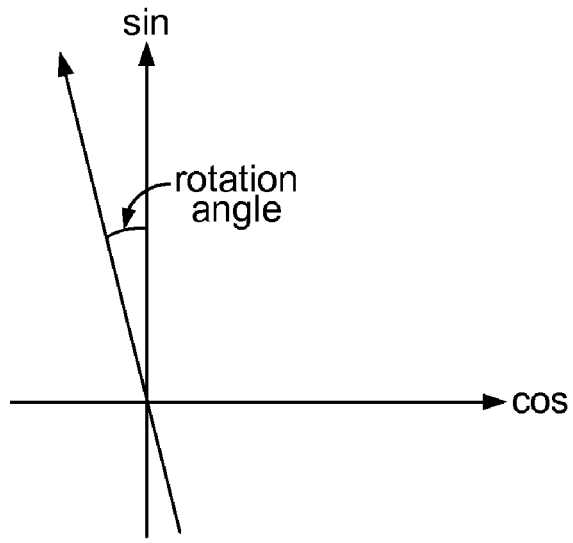
FIG. 4A illustrates how the sine and cosine components are rotated by a calibrated rotation angle.
FIG. 4B illustrates an embodiment of the present invention wherein rotation angles are calibrated for N and Q servo bursts at different radial locations (different servo tracks).
FIG. 4C illustrates equations for rotating the sine and cosine components by the calibrated rotation angle according to an embodiment of the present invention.

FIG. 4A illustrates a vector representing the sine and cosine components of the read signal when reading adjacent servo bursts having a phase offset as described above. In one embodiment, the rotation angle for rotating the vector so as to cancel the cosine component may be computed as shown in FIG. 4B for each of the N and Q servo bursts at a particular radial location (servo track tk#). In another embodiment, the rotation angle may be calibrated by adjusting the rotation angle until the cosine component of the read signal is substantially zero. In one embodiment, the rotation angle may be measured at a predetermined resolution over the radius of the disk (e.g., at every N servo track) and then a suitable curve fitting function used to compute the rotation angle for each servo track during normal operation. In other embodiments, instead of generating (or looking up) the rotation angle for each servo track, the cosine and sine component of the rotation angle may be generated (or looked up) for each servo track.

FIG. 4C illustrates equations for rotating the sine and cosine components of the read signal by the calibrated rotation angle according to an embodiment of the present invention. Rotating the sine component involves multiplying the cosine component by the sine of the rotation angle and multiplying the sine component by the cosine of the rotation angle (and adding the results). In one embodiment, the sine and cosine of the rotation angle may be computed after generating (or looking up) the rotation angle for a current servo track, or the sine and cosine components of the rotation angle may be generated (or looked up) based on the servo track. For example, a polynomial function based on a curve fitting algorithm may be used to generate the rotation angle as a function of each track, or it may be used to generate the sine and cosine components of the rotation angle as a function of each track. Alternatively, a lookup table may be used to lookup the rotation angle for a given servo track, or a lookup table may be used to lookup the sine and cosine components of the rotation angle for a given servo track.

In the embodiment of FIG. 3A, the PES 48 is generated 50 in response to the rotated sine components of the N and Q servo bursts (the rotated cosine components are not used to generate the PES). Accordingly, in one embodiment only the equations of FIG. 4C for computing the rotated sine component of the N and Q servo bursts are implemented (i.e., the rotated cosine components may not be computed). In an alternative embodiment, the rotated cosine components are computed and used to verify that the rotation angle is accurate. That is, the rotated cosine components may be evaluated to verify they are substantially zero after rotating the vector as shown in FIG. 4A. If the cosine components are not substantially zero, the rotation angles may be recalibrated (and/or the function for generating the rotation angles may be adjusted).

The verification may also be performed over the life of the disk drive to determine when the rotation angle for the servo tracks should be recalibrated due to changes in operating conditions that may affect the accuracy of the rotation angle.

Figures 5A, 5B:
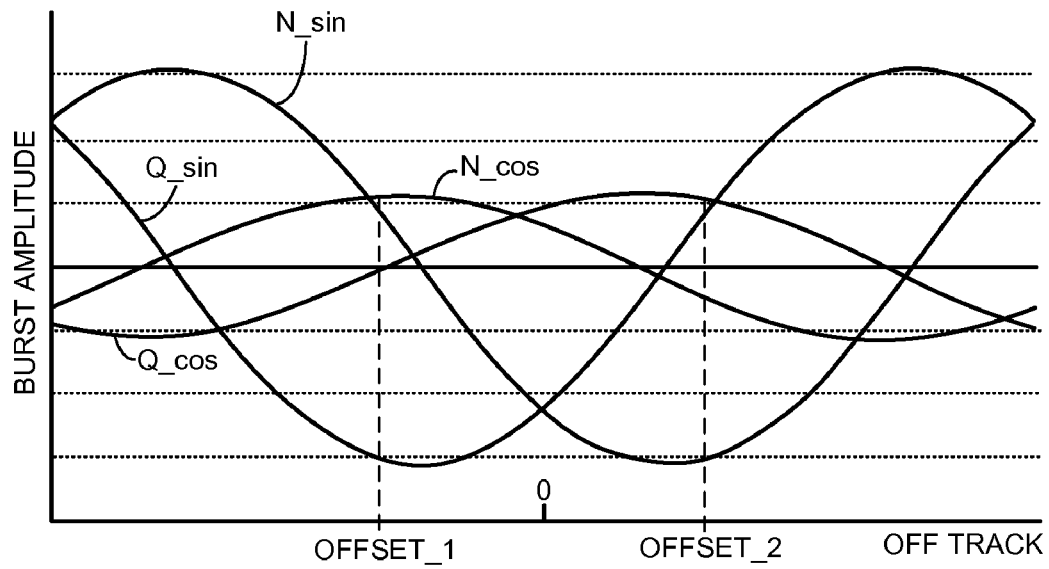
FIG. 5A shows an embodiment of the present invention wherein the rotation angle is calibrated by averaging two measurements at different radial offsets from a servo track.
FIG. 5B illustrates equations for computing the rotation angles as the average of two measurements according to an embodiment of the present invention.

FIG. 5A shows an embodiment of the present invention wherein the rotation angle is calibrated by averaging two measurements at different radial offsets from a servo track. In the example of FIG. 5A, the head is positioned at a first offset (OFFSET_1) away from the center of a servo track and a first rotation angle computed (or calibrated). The head is then positioned at a second offset (OFFSET_2) away from the center of the servo track (in the opposite direction) and a second rotation angle computed (or calibrated). The rotation angle for each of the N and Q servo bursts is then computed as shown in FIG. 5B by averaging the first and second rotation angles for each of the first and second offsets (OFFSET_1 and OFFSET_2).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of servo tracks defined by a plurality of servo sectors, wherein
      each servo sector comprises a plurality of servo bursts; and
      each servo burst comprises a predetermined phase;
   a head actuated over the disk; and
   control circuitry operable to:
      position the head over one of the servo tracks;
      read at least one servo burst in one of the servo sectors to generate a read signal;
      extract a sine and cosine component from the read signal;
      rotate at least one of the sine and cosine components by an angle based on a radial location of the head; and
      generate a position error signal for the head in response to the rotated component.

2. The disk drive as recited in claim 1, wherein:
   a first one of the servo bursts in a first servo sector comprises a N servo burst;
   a second one of the servo bursts in the first servo sector comprises a Q servo burst; and
   the N servo burst is offset radially from the Q servo burst by approximately a half of a servo track.

3. The disk drive as recited in claim 2, wherein the control circuitry is operable to:
  rotate the N servo burst read signal by a N_angle; and
  rotate the Q servo burst read signal by a Q_angle.

4. The disk drive as recited in claim 3, wherein the control circuitry is operable to generate the N_angle and the Q_angle at the radial location of the head:
  N_angle in response to a tan(N_cos/N_sin);
  Q_angle in response to a tan(Q_cos/Q_sin);
wherein:
  N_sin is a sine component of the N servo burst;
  N_cos is a cosine component of the N servo burst;
  Q_sin is a sine component of the Q servo burst; and
  Q_cos is a cosine component of the Q servo burst.

5. The disk drive as recited in claim 4, wherein the control circuitry is operable to generate the N_angle and the Q_angle at the radial location of the head:
  N_angle in response to (a tan__1 (N_cos/N_sin)+a tan__2 (N_cos/N_sin))/2;
  Q_angle in response to (a tan__1 (Q_cos/Q_sin)+a tan__2 (Q_cos/Q_sin))/2;
wherein:
  a tan__1 is computed at a first offset of the head relative to a servo track;
  a tan__2 is computed at a second offset of the head relative to the servo track;
  N_sin is a sine component of the N servo burst;
  N_cos is a cosine component of the N servo burst;
  Q_sin is a sine component of the Q servo burst; and
  Q_cos is a cosine component of the Q servo burst.

6. The disk drive as recited in claim 4, wherein the control circuitry is operable to rotate the sine components of the N and Q servo bursts to generate rotated sine components by computing:
  N'_sin=N_cos·sin(N_angle)+N_sin·cos(N_angle);
  Q'_sin=Q_cos·sin(Q_angle)+Q_sin·cos(Q_angle);
wherein:
  N'_sin is the rotated sine component of the N servo burst; and
  Q'_sin is the rotated sine component of the Q servo burst.

7. The disk drive as recited in claim 6, wherein the control circuitry generates the position error signal in response to N'_sin and Q'_sin.

8. A method of operating a disk drive, the disk drive comprising a head actuated over a disk comprising a plurality of servo tracks defined by a plurality of servo sectors, wherein each servo sector comprises a plurality of servo bursts, and each servo burst comprises a predetermined phase, the method comprising:
  positioning the head over one of the servo tracks;
  reading at least one servo burst in one of the servo sectors to generate a read signal;
  extracting a sine and cosine component from the read signal;
  rotating at least one of the sine and cosine components by an angle based on a radial location of the head; and
  generating a position error signal for the head in response to the rotated component.

9. The method as recited in claim 8, wherein:
  a first one of the servo bursts in a first servo sector comprises a N servo burst;
  a second one of the servo bursts in the first servo sector comprises a Q servo burst; and
  the N servo burst is offset radially from the Q servo burst by approximately a half of a servo track.

10. The method as recited in claim 9, further comprising:
  rotating the N servo burst read signal by a N_angle; and
  rotating the Q servo burst read signal by a Q_angle.

11. The method as recited in claim 10, further comprising generating the N_angle and the Q_angle at the radial location of the head:
  N_angle in response to a tan(N_cos/N_sin);
  Q_angle in response to a tan(Q_cos/Q_sin);
wherein:
  N_sin is a sine component of the N servo burst;
  N_cos is a cosine component of the N servo burst;
  Q_sin is a sine component of the Q servo burst; and
  Q_cos is a cosine component of the Q servo burst.

12. The method as recited in claim 11, further comprising generating the N_angle and the Q_angle at the radial location of the head:
  N_angle in response to (a tan__1(N_cos/N_sin)+a tan__2 (N_cos/N_sin))/2;
  Q_angle in response to (a tan__1(Q_cos/Q_sin)+a tan__2 (Q_cos/Q_sin))/2;
wherein:
  a tan__1 is computed at a first offset of the head relative to a servo track;
  a tan__2 is computed at a second offset of the head relative to the servo track;
  N_sin is a sine component of the N servo burst;
  N_cos is a cosine component of the N servo burst;
  Q_sin is a sine component of the Q servo burst; and
  Q_cos is a cosine component of the Q servo burst.

13. The method as recited in claim 11, further comprising rotating the sine components of the N and Q servo bursts to generate rotated sine components by computing:
  N'_sin=N_cos·sin(N_angle)+N_sin·cos(N_angle);
  Q'_sin=Q_cos·sin(Q_angle)+Q_sin·cos(Q_angle);
wherein:
  N'_sin is the rotated sine component of the N servo burst; and
  Q'_sin is the rotated sine component of the Q servo burst.

14. The method as recited in claim 13, further comprising generating the position error signal in response to N'_sin and Q'_sin.

\* \* \* \* \*